3,367,995
METHOD FOR PREPARING GRAFT COPOLYMERS OF DIENE RUBBER, STYRENE, ACRYLONITRILE AND ALPHA-METHYL STYRENE
Masaaki Yoshino and Masataka Isogawa, Kobe, Japan, assignors to Kanegafuchi Chemical Industry Company, Limited, Higashi-ku, Osaka, Japan, a corporation of Japan
No Drawing. Filed Feb. 26, 1965, Ser. No. 435,706
1 Claim. (Cl. 260—880)

ABSTRACT OF THE DISCLOSURE

A process for the manufacture of a graft copolymer containing, by weight, substantially 5% to 35% synthetic diene rubber, 15% to 60% alpha-methyl styrene, 15% to 45% acrylonitrile, and 4% to 40% styrene.

*Disclosure*

This invention generally relates to the manufacture of synthetic diene rubber graft-copolymers, and more particularly to the manufacture of a graft-copolymer of alpha-methyl styrene, acrylonitrile and styrene with synthetic diene rubber.

Insofar as this disclosure is concerned, synthetic diene rubber is deemed to mean a butadiene homopolymer or copolymer containing more than 70% butadiene, such as polybutadiene and the well known synthetic rubber copolymer of butadiene-styrene.

The primary object of this invention is the provision of a process of manufacturing a synthetic resin having high impact resistance and resistance to distortion by heat.

The synthetic resin comprising a graft-copolymer of styrene and acrylonitrile with synthetic diene rubber has been proven to have excellent physical and chemical properties, and is now being put to use as one of the ABS resins. In order to give this graft-copolymer increased resistance to distortion under heat, it has been proposed to replace a part of the styrene monomer with alpha-methyl styrene.

The general process of manufacturing the graft-copolymer of styrene, acrylonitrile and synthetic diene rubber has been by way of adding to the synthetic rubber latex a monomer mixture consisting of acrylonitrile and styrene, and then effecting graft copolymerization. Such process must be very rigidly controlled, for if the monomer mixture of acrylonitrile and styrene is added at once, during the initial period of polymerization, or, in the case of continuous addition of the monomers of acrylonitrile and styrene in a continuous process of polymerization, the rate of addition is accelerated, the impact resistance of the synthetic resin thus produced is considerably lowered. It has thus been found necessary to continuously add the monomer mixture of styrene and acrylonitrile to the synthetic diene rubber latex at a rate roughly identical to the rate of polymerization and to effect the polymerization of the monomer mixture with the synthetic diene rubber as promptly as possible, keeping the concentration of monomer mixture in the system as low as possible.

In the manufacture of a graft copolymer of synthetic diene rubber in which a part of the styrene is replaced by alpha-methyl styrene, the continuous adding method previously used in connection with the manufacture of a graft-copolymer of styrene and acrylonitrile with synthetic diene rubber was tried. It was determined that when the quantity of alpha-methyl styrene amounted to over 35% of the total amount of the monomer mixture, polymerization was inhibited from normal progress, and, even if a high final conversion was attained by a sudden rapid reaction after the prolonged inhibition period, the impact resistance of the synthetic resin thus produced would be extremely low. As the amount of alpha-methyl styrene was increased to over 55%, it became impossible to attain a high rate of polymerization. Attempts were made to increase the rate of polymerization by increasing the amount of catalyst, raising the polymerization temperature, and by other usual methods of accelerating polymerization, however, the same did not result in any material increase in the rate of polymerization, and, when forcibly applied, the synthetic resin formed was contaminated, heat stability impaired, and impact resistance lowered. Previous methods for the manufacture of a graft-copolymer comprising styrene, acrylonitrile and alpha-methyl styrene with synthetic diene rubber have thus proven unsuitable.

After considerable research, we discovered that a synthetic resin comprising a graft-copolymer of styrene, acrylonitrile and a large amount of alpha-methyl styrene with synthetic diene rubber could be prepared by the process of continuously adding, as a first stage, to synthetic diene rubber latex, a monomer mixture consisting of acrylonitrile and styrene, or a monomer mixture of acrylonitrile, styrene, and a small amount of alpha-methyl styrene, and then, after polymerization of the synthetic diene rubber latex and the monomer mixture of the first stage has substantially come to completion, continuously adding, as a second stage, a monomer mixture consisting of acrylonitrile and alpha-methyl styrene, or acrylonitrile, alpha-methyl styrene and a small amount of styrene, and then bringing polymerization to completion.

In our process, the quantity of alpha-methyl styrene contained in the monomer mixture of the first stage should not be over 30% by weight. The total amount of the monomer mixture added in the first stage should also be restricted, the same being 1/9 to 6/9 by weight of the amount of the monomer mixture added in the second stage. If the monomer mixture added in the first stage is less than 1/9 by weight the amount of monomer mixture added in the second stage, graft polymerization of the monomer mixture added in the second stage will not proceed satisfactorily, and if the amount of monomer mixture added in the first stage is more than 6/9 by weight of the amount of the monomer mixture added in the second stage, it is impossible to obtain an end synthetic resin having suitable resistance to distortion under heat.

The composition of the monomer mixture to be added in the first stage is preferably, by weight, 20% to 50% acrylonitrile, 40% to 80% styrene, and 0% to 30% alpha-methyl styrene. The composition of the monomer mixture added in the second stage is preferably, by weight, 20% to 50% acrylonitrile, 0% to 30% styrene, and 40% to 80% alpha-methyl styrene.

The quantity of synthetic diene rubber employed in our process preferably comprises, by weight, 5% to 30% of the synthetic diene rubber plus mixed monomer ingredients of polymerization.

The synthetic resin obtained by the improved process of graft-copolymerization above disclosed preferably has a composition of, by weight, 5% to 35% synthetic diene rubber, 15% to 60% alpha-methyl styrene, 15% to 45% acrylonitrile, and 4% to 40% styrene.

Optimum characteristics of the synthetic resin obtained, that is, a synthetic resin having an especially superior impact resistance, oil resistance, and resistance to distortion under heat will have, as an optimum composition, by weight, 10% to 30% synthetic diene rubber, 25% to 50% alpha-methyl styrene, 20% to 35% acrylonitrile, and 8% to 30% styrene.

TABLE 1

| Embodiment | 1 | 2 | 3 | 4 | 5 | 6 | 7 | 8 | 9 | 10 | 11 |
|---|---|---|---|---|---|---|---|---|---|---|---|
| Synthetic rubber: | | | | | | | | | | | |
| Polybutadiene | 20 | 20 | 20 | 18 | 16 | 16 | 15 | 10 | 0 | 0 | 0 |
| Styrene-butadiene copolymer | 0 | 0 | 0 | 0 | 0 | 0 | 0 | 0 | 20 | 20 | 15 |
| First-stage addition monomer: | | | | | | | | | | | |
| Acrylonitrile | 10 | 7 | 12 | 9 | 10 | 9 | 7 | 6 | 7 | 4 | 7 |
| Styrene | 15 | 12 | 11 | 14 | 16 | 11 | 8 | 7 | 12 | 5 | 8 |
| Alpha-methyl styrene | 0 | 0 | 6 | 0 | 0 | 0 | 2 | 3 | 0 | 1 | 2 |
| Second-stage addition monomer: | | | | | | | | | | | |
| Acrylonitrile | 16 | 21 | 15 | 14 | 18 | 19 | 23 | 21 | 21 | 24 | 23 |
| Styrene | 4 | 0 | 1 | 5 | 0 | 0 | 10 | 8 | 0 | 1 | 5 |
| Alpha-methyl styrene | 35 | 40 | 35 | 40 | 40 | 45 | 35 | 45 | 40 | 45 | 40 |
| Rate of conversion (percent): | | | | | | | | | | | |
| 2 hours after | 85 | 81 | 58 | 78 | 70 | 74 | 70 | 75 | 80 | 70 | 68 |
| 4 hours after | 88 | 87 | 79 | 80 | 79 | 82 | 85 | 86 | 81 | 85 | 82 |
| 6 hours after | 90 | 85 | 88 | 86 | 85 | 87 | 89 | 90 | 86 | 88 | 88 |
| 8 hours after | 93 | 90 | 90 | 88 | 89 | 91 | 90 | 89 | 87 | 90 | 88 |
| Tensile strength (kg./cm.$^2$) | 385 | 382 | 410 | 415 | 437 | 423 | 458 | 470 | 368 | 375 | 399 |
| Izod impact (kg. cm./cm.$^2$) with notch | 44.6 | 43.7 | 38.5 | 54.6 | 41.6 | 38.7 | 42.3 | 20.4 | 45.8 | 56.1 | 38.6 |
| Rockwell hardness (R) | 104 | 103 | 104 | 106 | 107 | 107 | 107 | 109 | 103 | 105 | 107 |
| Softening point* (° C.) | 107 | 114 | 110 | 116 | 118 | 118 | 118 | 112 | 119 | 116 | 117 | 115 |

*In the above table, resistance to distortion under heat is indicated in terms of the softening point. The softening point was obtained by forming the test agent into a film from the press; taking a test piece therefrom of approximately 0.1 to 0.2 mm. in thickness, 5.0 mm. in width, and 10 mm. in length; applying a load thereto of 100 g./mm.$^2$; and raising the temperature thereof at the rate of 2° C./min. The tempearture at the bending point of the test sample was taken as the softening point.

Table 1 shows examples of graft-copolymerization carried out by our improved process. The ingredients of synthetic diene rubber latex and monomers of acrylonitrile, styrene, and alpha-methyl styrene were varied as noted in the table, polymerization being carried out as follows:

In the polymerization reaction vessel was placed the amount of synthetic diene rubber latex specified, together with 0.05 part sodium hydroxide, 0.2 part ascorbic acid, 0.0025 part ferrous sulfate, 0.01 part disodium salt of ethylenediaminetetraacetic acid, and 250 parts water (with the addition of the water of latex). After deoxidation, the vessel was heated to 60° C. under a nitrogen current.

Then, 5 parts of the first stage monomer mixture was added, and the mixture thoroughly agitated and dispersed for 30 minutes at 60° C.

To the remaining first stage monomer mixture was added, by weight, 0.8% mixed tertiary mercaptans and 0.2% cumene hydroperoxide. Such remaining first stage monomer mixture was then continuously added to the reaction system while polymerization continued.

When polymerization of the first stage added monomer mixture substantially came to completion, the second stage monomer mixture was continuously added to the reaction system, such second stage monomer mixture including, by weight 0.2% tertiary mercaptans and 0.2% cumene hydroperoxide.

After addition of the second stage monomer mixture had terminated, further agitation was carried out at 60° C. for another 2 hours. The rate of conversion of the added monomer at each time into copolymer may be calculated by measuring the solid content through evaporation and solidification under the presence of hydroquinone. The polymer was coagulated with sodium chloride and hydrochloric acid, and heated and had the granules coagulated, and, thereafter, it was filtered, washed and dried.

TABLE 2

| Referential example | 1 | 2 | 3 | 4 |
|---|---|---|---|---|
| Synthetic rubber: | | | | |
| Polybutadiene | 20 | 20 | 20 | 0 |
| Styrene-butadiene copolymer | 0 | 0 | 0 | 20 |
| Monomer: | | | | |
| Acrylonitrile | 26 | 27 | 26 | 28 |
| Styrene | 24 | 13 | 9 | 12 |
| Alpha-methyl styrene | 30 | 40 | 45 | 40 |
| Rate of conversion (percent): | | | | |
| 2 hours after | 33 | 26 | 18 | 23 |
| 4 hours after | 68 | 58 | 38 | 50 |
| 6 hours after | 80 | 78 | 58 | 74 |
| 8 hours after | 87 | 85 | 62 | 80 |
| Tensile strength (kg./cm.$^2$) | 393 | 385 | -------- | 377 |
| Izod impact (kg. cm./cm.$^2$) with notch | 8.6 | 3.0 | -------- | 4.1 |
| Rockwell hardness (R) | 106 | 104 | -------- | 105 |
| Softening point (° C.) | 108 | 114 | -------- | 113 |

Table 2 shows examples of graft-copolymerization carried out under substantially similar conditions as those of Table 1. Comparable continuous type polymerization reaction systems were used, operating procedures were the same, and incidental necessary ingredients, such as catalysts, etc., were the same.

The process followed in the examples of Table 2 differed from that followed with respect to the examples of Table 1 only in that the monomers of Table 2 were mixed together and continuously added to the synthetic diene rubber latex during polymerization, as distinguished from the stage by stage addition of monomer mixtures as previously described in connection with the examples of Table 1.

In order to make the examples of Tables 1 and 2 as directly comparable as possible, the total duration of continuous additions of the first and second stage monomer mixture in the process of Table 1 and the duration of mixed monomer continuous addition in the process of Table 2 were identical, six hours.

In the reference examples of Table 2, as the amount of alpha-methyl styrene contained in the mixed monomers increased, the rate of conversion was seen to drop, especially in the early stages of addition, and the impact resistance of the synthetic resin thus formed was very low.

It is to be noted that in the manufacture of a graft-copolymer of synthetic diene rubber according to our process, as shown by the examples of Table 1, a large amount of alpha-methyl styrene can be graft-copolymerized smoothly while good impact resistance is maintained. As the amount of alpha-methyl styrene is increased, the softening point goes up. If the amount of alpha-methyl styrene in the first stage addition of monomer mixture is increased, the rate of conversion in the early stages of addition will decline, and in view of this, it is preferable that the amount of alpha-methyl styrene in the first stage monomer mixture be not more than 30%.

The formed resin of embodiment 2 of Table 1 was fractionally extracted and the graft percentage was measured. At the time of completion of the addition of the first stage monomer mixture, the graft percentage was 56.0%, while, at the time of completion of addition of the mixture of the second stage of monomer mixture, it was 98.8%. Accordingly, it was determined that about 59% of the former and about 14% of the latter were successfully graft-copolymerized.

Various changes may be made in the form of invention herein described without departing from the spirit of the invention or the scope of the following claims.

We claim:

1. A process for the manufacture of a graft copolymer containing, by weight, substantially 5% to 35% synthetic diene rubber, 15% to 60% alpha-methyl styrene, 15% to 45% acrylonitrile, and 4% to 40% styrene, which includes the steps of charging a polymerization system with a synthetic diene rubber latex selected from the group consisting of butadiene homopolymers and butadiene copolymers comprising at least 70% by weight polymerized butadiene; as a first stage, as polymerization proceeds, continuously adding to the system a monomer mixture comprising, by weight, 20% to 50% acrylonitrile, 40% to 80% styrene, and 0% to 30% alpha-methyl styrene; after polymerization of the monomer mixture of the first stage is substantially completed, as a second stage, continuously adding to the system a monomer mixture comprising, by weight, 20% to 50% acrylonitrile, 0% to 30% styrene, and 40% to 80% alpha-methyl styrene; and completing desired polymerization of the total ingredients, the monomer mixture added in the first stage being 1/9 to 6/9 by weight of the monomer mixture of the second stage, and the amount of synthetic diene rubber comprising from 5% to 30% by weight of the total amount of the synthetic diene rubber and the monomers.

References Cited
UNITED STATES PATENTS

| | | | |
|---|---|---|---|
| 3,268,625 | 8/1966 | Jones et al. | 260—880 |
| 3,278,642 | 10/1966 | Lee | 260—880 |
| 3,288,887 | 11/1966 | Yoshino et al. | 260—880 |

G. F. LESMES, *Primary Examiner.*